UNITED STATES PATENT OFFICE.

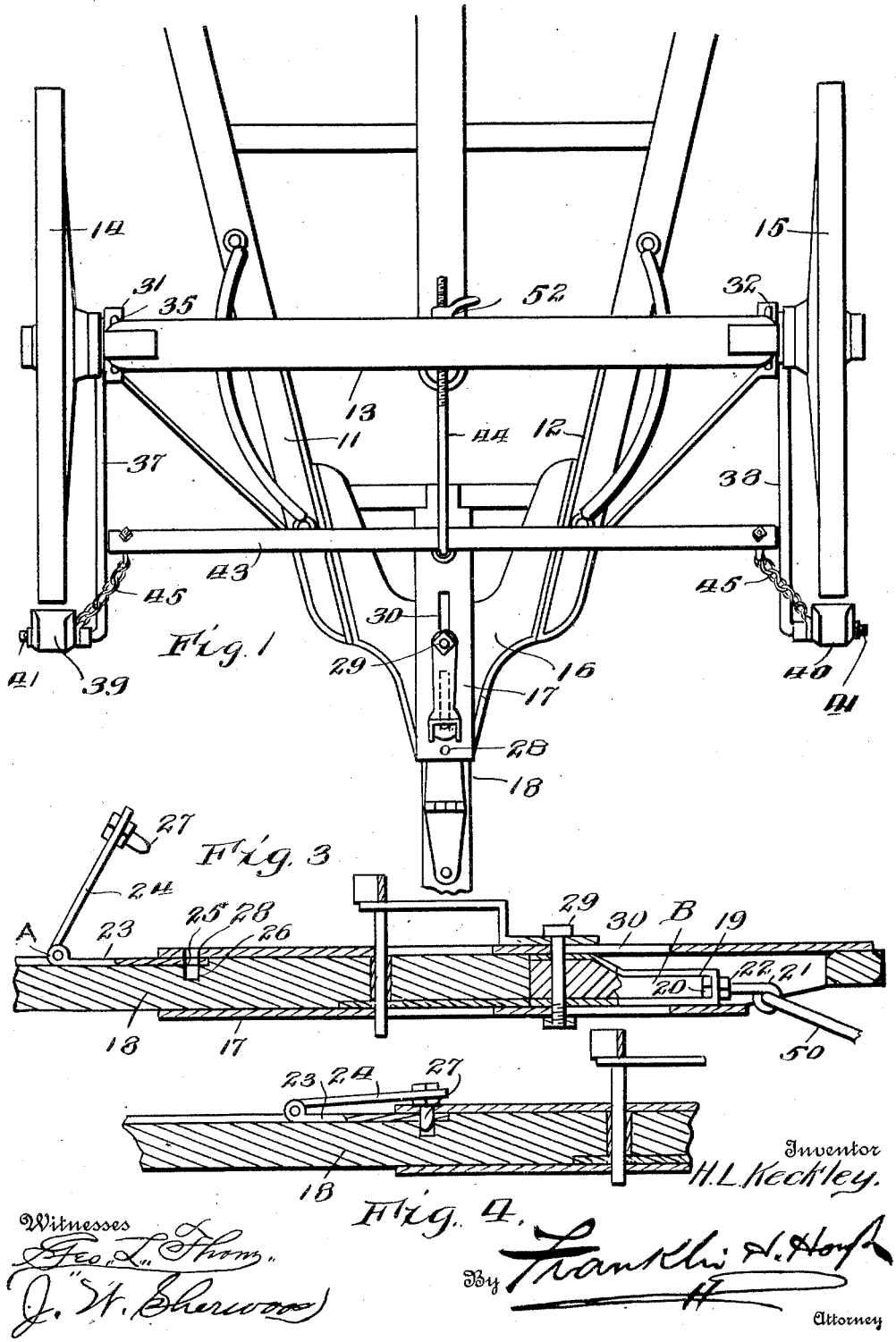

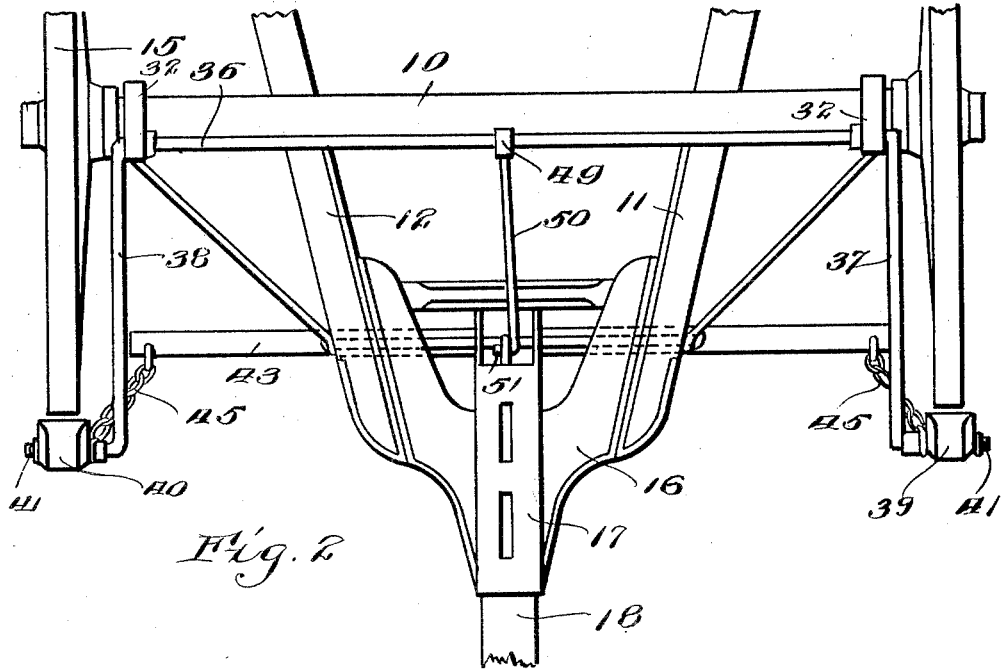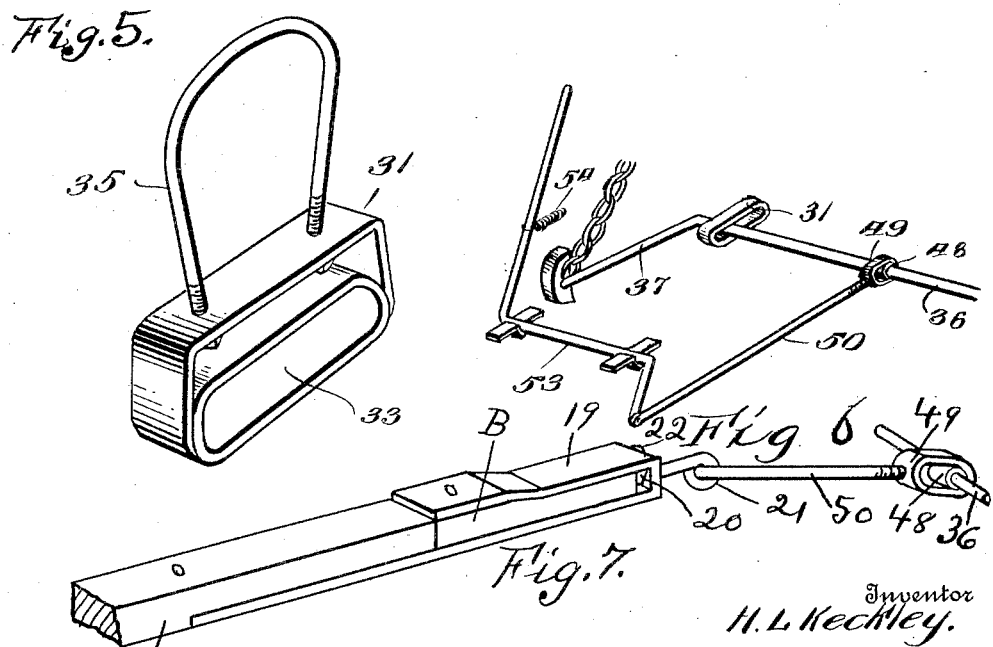

HARRY L. KECKLEY, OF UTICA, OHIO.

VEHICLE-BRAKE.

1,009,711. Specification of Letters Patent. Patented Nov. 21, 1911.

Application filed March 11, 1911. Serial No. 613,832.

*To all whom it may concern:*

Be it known that I, HARRY L. KECKLEY, a citizen of the United States, residing at Utica, in the county of Licking and State of Ohio, have invented certain new and useful Improvements in Vehicle-Brakes; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to vehicle brakes and the object of the invention resides in the provision of a vehicle brake which is adapted to be operated by the movement of the tongue of the vehicle so that the same will be automatically set when going down grade and released on reaching a level or traveling up grade.

A further object of the invention resides in the provision of a vehicle brake which includes a removable tongue which may be removed from the wagon when the double tree pin is withdrawn.

A further object of the invention resides in the provision of a vehicle brake of this character which includes means whereby the brake actuating mechanism may be locked against the influence of the movement of the tongue so that the backing of the vehicle will be without effect on the brake mechanism.

A further object of the invention resides in the provision of a vehicle brake which is adapted to be placed on the front gear and connected to the rocker shaft with which ordinary hand brakes are operated.

Finally, the object of the invention resides in the provision of a brake mechanism in connection with vehicles which will be simple in construction, efficient in use, and which may be manufactured and installed upon various types of vehicles at a reasonably small cost.

With these objects in view, the invention consists in the details of construction, arrangement and combination of parts to be hereinafter more fully described and particularly pointed out in the appended claims.

In describing the invention in detail reference will be had to the accompanying drawings wherein like characters of reference denote corresponding parts in the several views, and in which:—

Figure 1 is a plan view of the forward end of a wagon having a brake mechanism constructed in accordance with the invention associated therewith, the body of the wagon being removed so as to expose the brake structure to view. Fig. 2 is a bottom view of a portion of what is shown in Fig. 1. Fig. 3 is a longitudinal section through a fragment of the tongue and through the supporting sleeve thereof carried by the pivoted hound frame showing the means for locking the tongue against sliding movement in the supporting sleeve in unlocked position. It also shows the construction by which the tongue is made removable. Fig. 4 is a view similar to Fig. 3, showing the means for locking the tongue against sliding movement in its supporting sleeve in locked position. Fig. 5 is a detail perspective view showing the manner of supporting the beam which carries the brake shoes. Fig. 6 is a detail perspective of the brake throwing mechanism, and Fig. 7 is a perspective view showing the tongue and connections thereto.

Referring to the drawings, 10 indicates the forward axle, 11 and 12 the forward hounds and 13 the sand board supported upon the forward hounds. The axle 10 carries at each end the usual traction wheels 14 and 15. Pivoted between the forward ends of the hounds 11 and 12 is a hound frame 16 which carries a metallic sleeve 17 secured thereto in any suitable manner and disposed longitudinally of the wagon. Mounted for a sliding movement in the sleeve 17 is the rear end of the wagon tongue 18. Immediately adjacent the rear end of the tongue is a wooden block B upon which is secured a metal cap 19 and embedded in the rear end of said block B and disposed adjacent the inner face of cap 19 is a nut 20 in which is screwed the end of the eye bolt 21, this eye bolt also having threaded on its shank a nut 22 disposed adjacent the outer face of the cap 19 and adapted to be screwed against the latter so as to bind the eye bolt 21 in place. The lower point of cap 19 extends forward under the rear end of the tongue until it passes the double tree pin hole and has a hole drilled in said lower point registering with said double tree pin hole. By this construction, it is apparent that, when the double tree pin is withdrawn, the tongue may be removed from the wagon.

Mounted upon the upper side of the tongue 18 is a locking member A which includes hinge sections 23 and 24, the former of which is fixed to said tongue and disposed adjacent the inner end of the latter, while the section 24 is free to swing toward and away from the section 23. This fixed or inner section of the locking device A is provided with an aperture 25 which registers with a recess 26 in the upper face of the tongue. The section 24 of the locking device carries adjacent its free end a pin 27 which, when the section 24 is moved toward the section 23, a sufficient distance, will enter the aperture 25 and the recess 26, access of the pin 27 to said aperture 25 and recess 26 being had by way of an aperture 28 in the sleeve 17, said aperture 28 registering with the aperture 25. By this construction, it will be apparent that, when the section 24 of the locking member A is disposed so as to hold the pin 27 out of the apertures 28 and 25 and the recess 26, the tongue 18 will be free to slide longitudinally in the sleeve 17, said sliding movement of the tongue 18 being limited by means of a hammer strap bolt 29 secured to the tongue and projecting through a longitudinal slot 30 in the sleeve 17, also limited by the double tree pin projecting through a similar slot.

Mounted on each end of the axle 10 respectively are brake beam carriers 31 and 32 provided respectively with slots 33. These carriers 31 and 32 are bound to axle 10 by means of clips 35 in the usual well known manner. Movably mounted in the slots 33 of the carriers 31 and 32 is a brake beam 36 which has its terminal portions bent forward to form cranks and upon these cranks are mounted brake shoes 39 and 40 positioned for operative engagement with the traction wheels 14 and 15 respectively. The brake shoes 39 and 40 are each held upon the crank portions 37 and 38 by means of cotter pins 41. The free ends of the cranks 37 and 38 and the brake shoes carried thereby are supported by means of a bar 43 carried in the free end of a supporting rod 44 projecting from the sand board 13, the free ends of this bar 43 being connected by chains 45 with the free ends of the cranks 37 and 38 respectively. The beam 36 is held against movement longitudinally of the carriers 31 and 32 respectively by means of suitable collars. Surrounding the beam 36 near the center thereof is a collar 48 and surrounding this collar 48 is another collar 49 substantially elliptical in shape and having a threaded aperture therethrough which receives the threaded end of a link 50, which, when screwed home, bears against the collar 48. The other end of this link 50 is bent laterally as at 51 and engages in the eye bolt 21. The supporting rod 44 extends at its inner end through the sand board 13 and said inner end has mounted thereon an adjusting nut 52 by means of which the bar 43 may be drawn toward the sandboard and elevate the cranks 37 and 38 and the brake shoes carried thereby by means of the various connections heretofore described between said bar and cranks. This structure by means of which the brake shoes may be elevated through the manipulation of the supporting rod 44 can be utilized to bring the brake shoes 39 and 40 nearer the periphery of the respective traction wheels 14 and 15, owing to the fact that the pivot of the cranks 37 and 38 is disposed eccentrically to the axis of rotation of the traction wheels 14 and 15. It will be apparent that by thus bringing the brake shoes 39 and 40 nearer their respective traction wheels it will necessitate less power and movement of the tongue to effect the application of said brake shoes against the periphery of the respective traction wheels. It will be further noted that, owing to the eccentric pivot of the cranks 37 and 38 with respect to the axis of rotation of the traction wheels 14 and 15 if the free ends of said cranks are elevated through any suitable means such as a strap or cable, the brake shoes will eventually be brought into contact with the peripheries of the respective traction wheels and, while the engagement between the brake shoes and the traction wheels thus produced is present, should there be any tendency of the vehicle to move backward down hill such tendency will automatically increase the application of the brake shoes and effectually prevent further backward movement of the vehicle.

When the vehicle is going down hill, the holding back of the draft animals will of course slide the tongue 18 inwardly of the sleeve 17 and this movement of the tongue will, by reason of its connection with the beam 36, cause said beam to move rearwardly in the slots of the carriers 31 and 32 and this rearward movement will effect the application of the brake shoes 39 and 40 to the respective traction wheels as will be apparent. As soon as this backward force is removed from the tongue 18 and the draft animals exert a forward pull, said tongue will slide forwardly in the sleeve 17 and again shift the brake shoes to released position.

What I claim to be new is:—

1. A vehicle brake comprising the combination of axles, wheels mounted thereon, hounds, a tubular socket member carried by one of the hounds, a tongue mounted for longitudinal movement within the socket member, an arm pivoted to the upper side of the tongue and provided with a lateral extension adapted to enter an opening in the socket member when the tongue is positioned at its forward longitudinal movement, brake beam carriers mounted upon one of the axles, each carrier provided with a slot, a brake beam mounted to have a backward and forward movement in said slot, a crank arm at each end of the brake beam, a shoe carried by each arm, a cross bar, connections between the same and the brake shoe, and means for moving said cross bar toward or away from the axle carrying the brake beam.

2. A vehicle brake comprising the combination of axles, wheels mounted thereon, hounds, a tubular socket member carried by one of the hounds, a tongue mounted for longitudinal movement within the socket member, an arm pivoted to the upper side of the tongue and provided with a lateral extension adapted to enter an opening in the socket member when the tongue is positioned at its forward longitudinal movement, brake beam carriers mounted upon one of the axles, each carrier provided with a slot, a brake beam mounted to have a backward and forward movement in said slot, a crank arm at each end of the brake beam, a shoe carried by each arm, a cross bar, connections between the same and the brake shoe, a rod fastened to said cross bar and having a threaded portion passing through the axle supporting said brake beam, and a nut mounted upon the threaded end of the rod.

3. A vehicle brake comprising the combination of axles, wheels mounted thereon, hounds, a tubular socket member carried by one of the hounds, a tongue mounted for longitudinal movement within the socket member, an arm pivoted to the upper side of the tongue and provided with a lateral extension adapted to enter an opening in the socket member when the tongue is positioned at its forward longitudinal movement, brake beam carriers mounted upon one of the axles, each carrier provided with a slot, a brake beam mounted to have a backward and forward movement in said slot, a crank arm at each end of the brake beam, a shoe carried by each arm, said brake beam having a sleeve thereon, an elongated sleeve about the sleeve upon said brake beam, a link having threaded connection with said elongated sleeve and adapted to bear against the inner sleeve, connections between the link and tongue, a cross bar adjustably connected to the sandboard, and connections between the cross bar and shoes.

In testimony whereof I hereunto affix my signature in the presence of two witnesses.

HARRY L. KECKLEY.

Witnesses:
 JOSEPH TEWELL,
 HARRY E. HARRIS.

---

Copies of this patent may be obtained for five cents each, by addressing the " Commissioner of Patents, Washington, D. C."